United States Patent
Tailor et al.

(10) Patent No.: US 10,505,687 B1
(45) Date of Patent: Dec. 10, 2019

(54) CONFIGURING REFERENCE-SIGNAL TRANSMISSION IN A WIRELESS COMMUNICATION SYSTEM BASED ON HANDOVER HISTORY

(71) Applicant: Sprint Spectrum L.P., Overland Park, KS (US)

(72) Inventors: Pinalkumari Tailor, Ashburn, VA (US); Yun Sung Kim, Ashburn, VA (US); Dennis Canoy, Ashburn, VA (US); Sandeep Mangrulkar, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 442 days.

(21) Appl. No.: 15/336,294

(22) Filed: Oct. 27, 2016

(51) Int. Cl.
*H04W 4/00* (2018.01)
*H04L 5/00* (2006.01)
*H04W 36/00* (2009.01)
*H04W 84/04* (2009.01)

(52) U.S. Cl.
CPC ......... *H04L 5/005* (2013.01); *H04W 36/0083* (2013.01); *H04W 84/042* (2013.01)

(58) Field of Classification Search
CPC ..... H04W 36/00; H04W 36/14; H04W 36/38; H04W 36/08; H04W 36/32; H04W 36/22
See application file for complete search history.

(56) References Cited

U.S. PATENT DOCUMENTS

| | | | |
|---|---|---|---|
| 2011/0223914 A1* | 9/2011 | Hashimoto | H04W 36/0085 455/436 |
| 2012/0039305 A1* | 2/2012 | Han | H04W 36/245 370/332 |
| 2014/0148172 A1* | 5/2014 | Brisebois | H04W 36/20 455/438 |
| 2015/0319611 A1 | 11/2015 | Garcia | |
| 2016/0088512 A1* | 3/2016 | Bergstrom | H04W 28/0263 370/330 |

* cited by examiner

*Primary Examiner* — Abdelillah Elmejjarmi

(57) ABSTRACT

A method and system to help provide efficient configuration of reference signal transmission in a wireless communication system. A processing system evaluates handover history between sectors in the system, considering the reference signal configurations of the sectors between which handovers have occurred, as a basis to determine what reference signal configurations to implement in one or more sectors. And the processing system may then cause the sectors to implement the determined reference signal configurations. Further, the processing system may iteratively repeat this process, to help optimize reference signal configurations throughout the region.

17 Claims, 6 Drawing Sheets

CONFIGURING REFERENCE-SIGNAL TRANSMISSION IN A WIRELESS COMMUNICATION SYSTEM BASED ON HANDOVER HISTORY

BACKGROUND

A typical wireless communication network includes a number of base stations each radiating to provide one or more coverage areas or "sectors" in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a WCD within coverage of the network may engage in air interface communication with a base station and may thereby communicate via the base station with various remote network entities or with other WCDs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of WCDs, initiation of communications, handover between sectors, and other functions.

Further, each sector may provide wireless service to WCDs on one or more carrier frequencies, with the air interface defining various downlink and uplink channels. For instance, on the downlink (in the direction from the base station to WCDs), the air interface may define a reference channel for carrying a reference signal that WCDs can measure to evaluate base station coverage strength, the air interface may define various other downlink control channels for carrying control signaling to WCDs, and the air interface may define one or more downlink traffic channels for carrying bearer data and other information to WCDs. And on the uplink (in the direction from WCDs to the base station), the air interface may define an access channel for carrying WCD access requests to the base station, the air interface may define one or more other uplink control channels for carrying control signaling to the base station, and the air interface may define one or more uplink traffic channels for carrying bearer data and other information to the base station.

When a WCD initially enters into coverage of such a system, the WCD may scan for a strongest sector in which to operate, and the WCD may then engage in signaling with base station that provides that sector, to register for service with the network. The WCD may then be served by the network a connected mode in which the WCD has an established radio-link-layer connection in that sector and the WCD and base station may exchange bearer data (e.g., application-layer communications), or in an idle mode in which the WCD does not have an established radio-link-layer connection in that sector but the WCD monitors the sector for page messages and may engage in signaling with the base station to transition to the connected mode.

When so served, the WCD may also monitor coverage strength of its serving sector and of other sectors that extend to the WCD's location, to help ensure that the WCD is served with sufficiently strong coverage and perhaps with the strongest available coverage. If the WCD's coverage of its serving sector becomes threshold weak and if coverage of another sector becomes threshold strong (e.g., threshold stronger than the serving sector's coverage or than a defined level), then the WCD may then hand over to the other sector. For instance, the WCD may transmit to its serving base station a measurement report specifying the other detected sector, and the base station and/or other network infrastructure may responsively coordinate handover of the WCD to be served by that other sector.

OVERVIEW

In an optimal wireless communication network, the reference signal provided respectively by each of various sectors would be physically distinct from the reference signals provided by any other sectors in the vicinity, so that WCDs can evaluate coverage on a per sector basis. While transmissions from sectors in the vicinity may contribute to the overall noise floor, having physically distinct reference signals per sector may at least enable WCDs to evaluate signal-to-noise ratio in a given sector, to help the WCD gauge whether to operate in that particular.

Interference between reference signal transmissions of nearby sectors can be minimized or avoided by implementing different air interface configurations for reference signal transmission in the sectors, such as by having the sectors provide their reference signals at different times than each other and/or on different frequencies than each other. Specifics of such reference signal configurations may vary based on the air interface protocol in use.

By way of example, under LTE, several different reference signal configurations are defined as mutually exclusive recurring patterns of frequency-time resources.

In particular, a typical LTE air interface spans a particular carrier frequency bandwidth, such as 5 MHz, 10 MHz, or 15 MHz for instance, divided into a continuum of 10-millisecond frames, with each frame divided into ten 1-millisecond subframes, and each subframe then divided over time into 0.67 microsecond symbol segments and divided over the frequency bandwidth into 15 kHz subcarriers. Each subframe thus defines a grid or array of resource elements, with each resource element spanning a 0.67 microsecond segment of time and occupying a 15 kHz subcarrier. And each resource element is adapted to carry a communication signal modulated on its subcarrier. LTE then defines three distinct reference signal configurations as mutually exclusive patterns of these resource elements on a per subframe basis, namely, as particular resource elements distributed throughout the frequency-time grid per subframe. And each LTE sector is configured to use one of these three reference signals configurations and to broadcast its reference signal in the resource elements of the configuration.

According to LTE, each sector (referred to as a "cell" in LTE parlance) broadcasts information that enables a WCD to find and evaluate the sector's reference signal.

In particular, each sector has an assigned primary synchronization signal (PSS) value and an assigned secondary synchronization signal (SSS) value, and the sector broadcasts these PSS and SSS values at the center of its frequency bandwidth every five subframes. These PSS and SSS broadcasts enable a WCD to establish time synchronization with the sector based on a priori knowledge of where the PSS and SSS lie within an LTE frame.

Further, a modulo 3 (MOD 3) function of a sector's PSS value produces a result of 0, 1, or 2, with each of these results corresponding respectively with one of three predefined reference signal configurations. Namely, a MOD 3 result of 0 corresponds with a standard baseline reference signal configuration defining a particular distribution of resource elements per subframe, a MOD 3 result of 1 corresponds with the baseline reference signal configuration fully shifted one subcarrier higher, and a MOD 3 result of 2 corresponds with the baseline reference signal configuration shifted two subcarriers higher. (In other LTE implementations, or under other protocols, it may of course be feasible to define some other quantity N of reference signal configurations, such as by using a different modulo operation, or in another manner.)

Still further, a predefined mathematical combination of the PSS and SSS values also produces a physical cell identity (PCI) value for the sector, which serves as an identifier of the sector for various purposes. And the PCI is used for coding a reference signal that the sector then broadcasts in the resource elements of the sector's reference signal configuration.

Thus, with this arrangement, every sector in an LTE network could have one of three reference signal configurations and could have a PCI that forms the basis for coding of the sector's reference signal. When a WCD is scanning for coverage, the WCD could thus establish synchronization with a sector, determine the sector's reference signal configuration based on the sector's PSS, and evaluate strength (e.g., signal-to-noise ratio) of the sector's reference signal coded with the sector's PCI and broadcast in the resource elements of the sector's reference signal configuration.

If nearby sectors have the same reference signal configuration as each other (e.g., broadcast their reference signals at the same time as each other and on the same frequency as each other), there is a risk of inter-sector reference signal interference. Consequently, it would be beneficial to lay out a network of sectors such that nearby sectors do not have the same reference signal configuration as each other.

With an LTE arrangement as described above, or with other arrangements, however, there may be a limited number of reference signal configurations. Thus, it may be difficult from an engineering perspective to configure nearby sectors to use different reference signal configurations. Further, this task would become increasing difficult when changes in network configuration occur, such as when a wireless service provider adds new sectors (e.g., adds new base stations) or changes base station configurations. Such changes in network configuration may necessitate extensive, time-consuming engineering effort to help ensure that the reference signals of nearby sectors do not unduly interfere with each other.

Disclosed herein is a method and system to help provide efficient configuration of reference signal transmission in a wireless communication system. In accordance with the disclosure, a processing system will automatically evaluate handover history between sectors in the system, considering the reference signal configurations of the sectors between which handovers have occurred, as a basis to help optimize reference signal configurations.

In particular, the processing system can use the extent of handovers between a pair of sectors as a representation of the extent to which the sectors overlap and thus an extent to which WCDs are likely to detect coverage of both sectors at once. And if the extent of handovers is high, the processing system could then responsively arrange for the two sectors to use different reference signal configurations than each other so as to help reduce likelihood of inter-sector reference signal interference. For instance, if the two sectors had the same reference signal configuration as each other, the processing system could invoke a change in the reference signal configuration of one of the sectors, so that their reference signal configurations would then be different than each other. Further, the processing system could select a different reference signal configuration to implement in the sector, with the selection being based on a determination that the extent of handovers that the sector has had with other sectors having the selected reference signal configuration is relatively low.

Accordingly, in one respect, disclosed is a method for configuring reference-signal transmission in a wireless communication system, where the wireless communication system includes a plurality of sectors, each sector having one of a plurality of distinct reference signal configurations, where handovers occur between sectors of the system and wherein each handover is either (i) a matching-configuration handover, in which the reference signal configurations of a source sector and target sector of the handover are the same as each other or (ii) a non-matching-configuration handover, in which the reference signal configurations of the source sector and target sector of the handover are different than each other.

In that scenario, the method can apply for a given sector (i.e., one of the sectors in the system), to control reference-signal transmission by that sector. As disclosed, the method involves determining a measure of how many handovers that have occurred to or from the given sector have been a matching-configuration handover. And the method then involves, based on that determined measure, changing the reference signal configuration of the given sector. For instance, the method could involve changing the reference signal configuration of the given sector in response to determining that the determined measure is threshold high, such as higher than a predefined threshold level or is higher than a corresponding measure of how many handovers to or from the given sector have been a non-matching configuration handover.

In another respect, disclosed is a method for configuring-signal transmission in a wireless communication system, where the wireless communication system includes a plurality of sectors, each sector being configured to use one of a plurality of distinct reference signal configurations. Here again, the method can apply for a given sector.

As disclosed, the method involves identifying handovers that have occurred between (i) the given sector and (ii) one or more neighboring sectors. Further, the method involves determining, respectively for each of the reference signal configurations, a measure of how many of the identified handovers were with a neighboring sector having the reference signal configuration. The method then involves determining which of the reference signal configurations has a lowest determined measure of how many of the identified handovers were with a neighboring sector having the reference signal configuration. And the method involves, based on the determination of which reference signal configuration has the lowest determined measure, causing the given sector to use the determined reference signal configuration.

Still further, in another respect, disclosed is a method for configuring reference-signal transmission in a wireless communication system, where the wireless communication system includes a plurality of sectors, each sector being configured to use one of N distinct reference signal configurations, where N is at least 3, where handovers occur between sectors of the system and wherein each handover is either a matching-configuration handover or a non-matching-configuration handover as discussed above, and where the wireless communication system includes a cell site providing N of the sectors.

In that scenario, as disclosed, the method includes, for each sector of the cell site, determining respectively for each of the N reference signal configurations a measure of how many handovers to or from the sector have been with a neighboring sector having the reference signal configuration. Further, the method involves, based on the measures determined for the sectors of the cell site, determining what permutation of the N reference signal configurations among the sectors of the cell site would minimize matching-configuration handover for the cell site. And the method involves configuring the cell site to implement the determined permutation of the N reference signal configurations.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network with a configuration like that described above. It will be understood, however, that principles of the disclosure can extend to apply in other scenarios as well, such as with different LTE configurations (e.g., allowing for a different number N of reference signal configurations, for instance), or with other air interface protocols altogether. More generally, elements, arrangements, and operations may be added, removed, combined, distributed, re-ordered, or otherwise modified. In addition, it will be understood that operations described as being performed by one or more entities may be implemented in various ways, such as by one or more processing units executing program instructions for instance.

Figure 1:
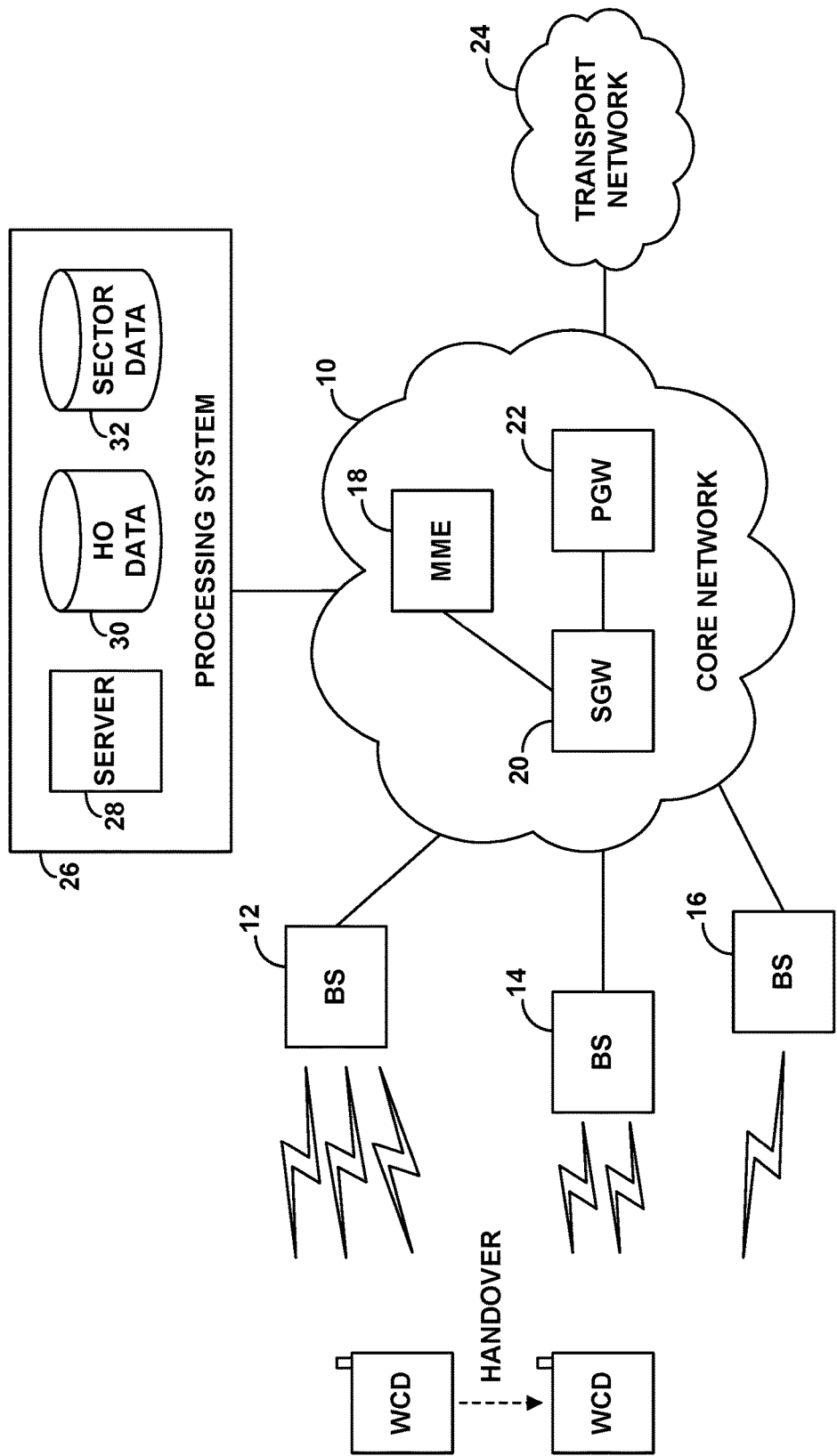
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve WCDs with wireless packet data communication service, including possibly voice-over-packet service, but may also provide other functions. The LTE network may be implemented by a wireless service provider. As shown, the LTE network includes a core network 10 (or "evolved packet core (EPC)") could be a packet-switched network, compliant with the industry standard system architecture evolution (SAE) for the LTE protocol, and thus the entities shown on the core network could each have an IP address and be configured to communicate with each other over packet-based tunnels or other communication interfaces, some of which could be dynamically configured as needed to serve individual WCDs for instance.

As shown, sitting on the core network 10 are by way of example several LTE base stations 12, 14, 16, referred to as evolved-Node-B's (eNodeBs), as well as a mobility management entity (MME) 18, a serving gateway (SGW) 20, and a packet data network (PDN) gateway (PGW) 22, with the PGW then providing connectivity with a packet-switched transport network 24 such as the Internet. In addition, shown on the core network 10 is a representative processing system 26, which could carry out various features described herein. This processing system could include a computer server 28, handover data 30, and sector data, some or all of which could be part of an element management system (EMS) of the core network for example.

As shown, each of the eNodeBs 12 is configured to provide one or more wireless coverage areas (sectors) in which the eNodeB can serve WCDs. As such, each eNodeB could take various forms. For instance, an eNodeB could be a macro eNodeB of the type typically including a tower-mounted antenna structure or the like and providing a broad range of coverage. Or an eNodeB could be a small-cell, femtocell, or picocell eNodeB or the like of the type typically having a smaller form factor and providing a narrower range of coverage. Further, each eNodeB could be communicatively linked with the core network by a landline connection and/or by a wired connection such as a wireless relay backhaul connection.

In practice, each eNodeB would include one or more antennas and associated equipment, such as a radio-frequency transceiver and a power amplifier, for radiating to provide each of the eNodeB's one or more sectors of coverage. Each sector in the system may thus have an origin point as a geographic location where the eNodeB's antenna structure is positioned and from which the sector's coverage emanates. Further, each sector would thus have a particular antenna pattern or area of coverage in which to serve WCDs. And each sector would have an azimuth, defining a direction of radiation from the sector's origin location, characterized by an angle of rotation around a vertical axis, possibly in relation to North (zero degrees) for instance, as well as a beamwidth of coverage. The azimuth of the sector could be configured by mechanical rotation of the eNodeB or of its antenna structure, or by controlling phase, amplitude, and/or other attributes of various phased array antenna elements or the like.

With this arrangement, each eNodeB at a physical location may define a cell site at that location, and the cell site may provide one or more sectors of coverage. By way of example, an eNodeB may be configured with an antenna structure and associated equipment to provide three directional sectors of coverage, having azimuths spaced 120 degrees from each other. Alternatively an eNodeB may be configured with an antenna structure and associated equipment to provide a lesser or greater number of sectors, still with each sector having an origin location and having an azimuth defining a direction of radiation from the origin location.

In each sector of such an LTE system, as discussed above, the eNodeB that provides the sector broadcasts a reference signal within a particular recurring pattern of resource elements defining the sector's reference signal configuration. Further, the eNodeB broadcasts in the sector a PSS and SSS, with a combination of the PSS and SSS values defining a PCI of the sector and being used for coding of the sector's reference signal, and with a MOD 3 function of the PSS value indicating the sector's reference signal configuration.

As further discussed above, when a WCD is served by such a sector, the WCD may monitor the strength of coverage of serving sector as well as the strength of coverage of neighboring sectors, in an effort to ensure that the WCD is served by the strongest sector. (In practice, a WCD may normally monitor just its serving sector's coverage strength and, when the WCD detects threshold weak coverage from its serving sector may then then scan for neighboring coverage for possible handover. Alternatively, the WCD's serving eNodeB may direct the WCD to engage in such scanning when the serving sector is threshold loaded or for other reasons.)

To evaluate coverage in any such sector, the WCD may read the sector's broadcast PSS and SSS values, compute the sector's PCI, and use the PCI to determine the coded reference signal expected from the sector. Further, the WCD may compute MOD 3 function of the sector's PSS value and may determine based on the resulting value (0, 1, or 2) what the sector's reference signal configure is, i.e., what predefined recurring pattern of resource elements carries the sector's broadcast reference signal. The WCD may then look for the expected reference signal in those resource elements and measure strength of that reference signal, and particularly a signal-to-noise ratio referred to in LTE as reference signal receive quality (RSRQ), where the numerator is the reference signal strength of the sector at issue and the denominator is other spectral energy defining a noise floor.

When a WCD thereby detects threshold strong coverage of a neighboring sector (e.g., having RSRP higher than a predefined threshold, or having RSRP threshold higher than RSRP of the WCD's serving sector), the WCD may send a measurement report to its serving eNodeB. And in response, the network may hand over the WCD from the serving sector to the reported neighboring (target) sector. By way of example, the serving eNodeB may engage in signaling with the eNodeB of the target sector to prepare the target sector to serve the WCD, and the serving eNodeB may then direct the WCD to transition to being served by the target sector. Alternatively, the serving eNodeB may engage in signaling with the MME, which may in turn engage in signaling with the target eNodeB to prepare the target sector to serve the WCD, and the serving eNodeB may then direct the WCD to transition to being served by the target sector.

Further, as handovers occur between sectors within such a system, the system may compile and maintain a record of the handovers. For example, the involved eNodeBs and/or MME could automatically report the occurrence of the handovers to an EMS, which could responsively update the handover data 30 to include records of the handovers, indicating for each handover various information such as unique source and target sector identifiers, time of handover, and so forth. The EMS could maintain this data on a sliding window basis over a most recent period of time or on another basis.

Figure 2:
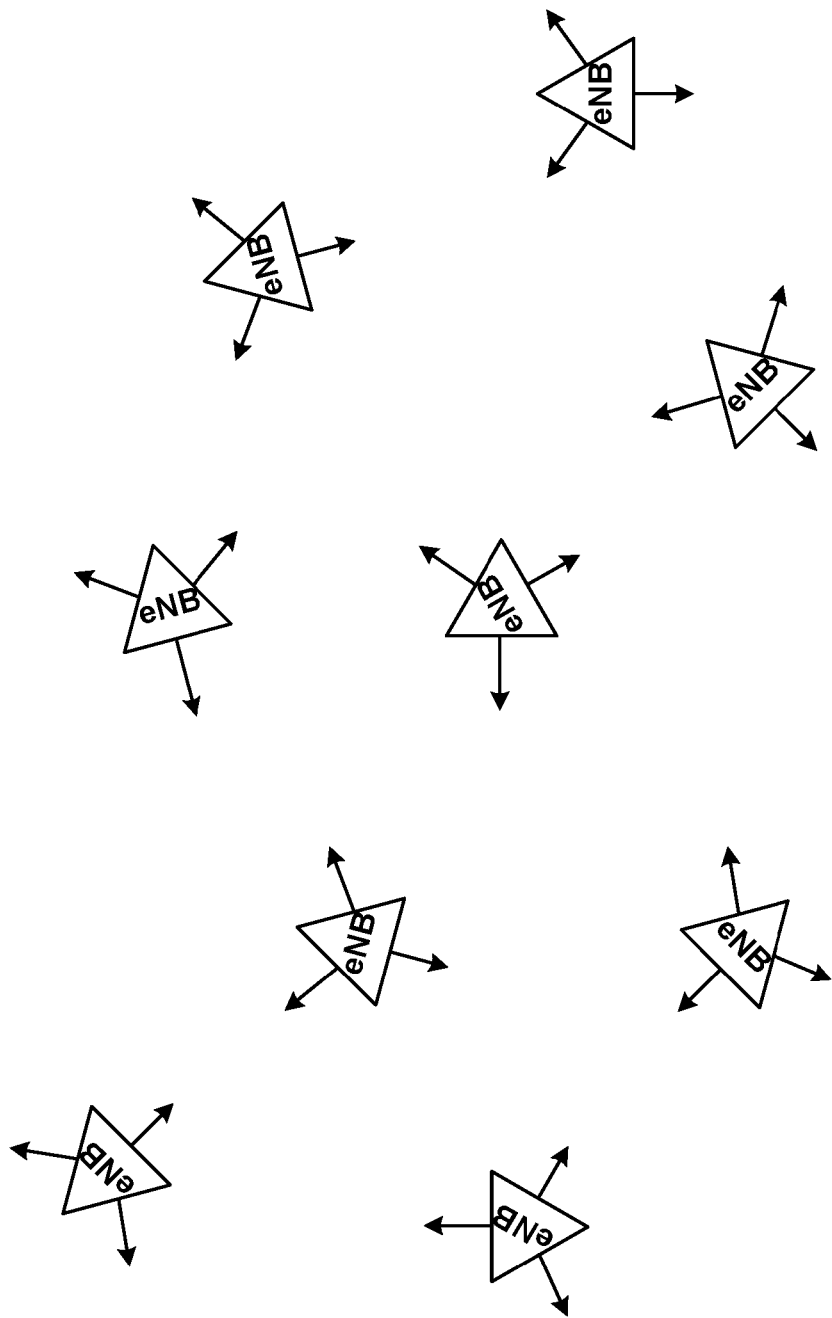
FIG. 2 depicts an example region of a wireless communication system including a plurality of cell sites.

FIG. 2 depicts an example region of the wireless communication system, in which a plurality of eNodeBs each define a respective cell site and each provide three representative directional sectors having respective origin locations and azimuths. In practice, a wireless service provide may put these eNodeBs in service throughout the region to help provide good coverage throughout the region and to facilitate seamless handover of served WCDs between sectors. In the figure, each eNodeB is represented by a triangle, with arrows pointing in directions representing the azimuths of the eNodeB's sectors.

In a representative LTE implementation, we can assume that all of the illustrated sectors in this region operate on the same carrier frequency as each other, but that each sector has a respective PCI, which is indicated by the sector's PSS and SSS values. Further, in each sector, the eNodeB providing the sector broadcasts a reference signal using a reference signal configuration indicated by a MOD 3 function of the sector's PSS value. In particular, with this arrangement as discussed above, there are three mutually exclusive reference signal configurations corresponding respectively with MOD 3 values 0, 1, and 2, each being a particular recurring pattern of resource elements.

In an LTE implementation where each cell site has three sectors, the wireless service provider may configure the three sectors of each cell site with PSS values (or PCI values) that provide different MOD 3 values than each other, so that the reference signal configurations of the three sectors will not overlap with each other.

At issue, however, is how to best distribute the reference signal configurations among the sectors of a cell site, considering the potential for reference signal interference with nearby sectors. Further, even in an implementation where a cell site defines just a single sector or perhaps just two sectors, at issue is what reference signal configuration to use in each such sector, considering the potential for reference signal interference with nearby sectors. These issues may arise when a wireless service provider changes network configuration by adding, removing, or restructuring eNodeBs in the region. Further, it may be useful to periodically evaluate network configuration to help ensure optimal reference signal configuration in the sectors.

In an example implementation, the sector data 32 will include information regarding the physical configuration of each sector within a region such as that shown in FIG. 2. For instance, the sector data could specify for each sector various attributes such a unique sector identifier and a current PSS (or PCI) value of the sector, an associated MOD 3 value of the sector, and/or another indication of which reference signal configuration the sector has. In practice, as a wireless service provider puts eNodeBs into service, removes eNodeBs from service, or changes configuration of eNodeBs in the system, the wireless service provider could record or update this data.

In accordance with the present method, the processing system will evaluate the history of handovers between sectors within the system and will take into consideration a comparison between reference signal configurations of sectors between which the handovers have occurred, as a basis to decide what reference signal configuration to implement in each of various sectors. Optimally, a pair of sectors between which handovers are relatively common could be configured with different reference signal configurations than each other, to help minimize the chance of reference-signal interference as between those sectors. Whereas, a pair of sectors between which handovers are relatively uncommon could be configured with the same reference signal configurations as each other, as there would seem to be a lesser chance of reference-signal interference between those sectors.

Thus, if the processing system determines from handover history that a relatively great number of such handovers have occurred between two sectors that have the same reference signal configuration as each other, the processing could seek to improve the network by invoking a change of reference signal configuration of one of those two sectors. For instance, the processing system could change the reference signal configuration of one of the sectors to a reference signal configuration selected based on a determination that the sector has had relatively few if any handovers with sectors having that reference signal configuration.

Carrying this out in practice, for instance, the processing system could iteratively analyze each of various sectors within a given region and could change a sector's reference signal configuration upon determining that the sector has been engaged in threshold many handovers with other sectors having the same reference signal configuration. In particular, for a given sector, the processing system could evaluate the handover data 30 and sector data 32 to establish a measure of how many handovers to or from the given sector have each been with a neighboring sector that has the same reference signal configuration as the given sector. This measure could take various forms. By way of example, the measure could be a ratio of a count of such handovers to the total number of handovers that have occurred to or from the sector at issue, or the measure could be a straight count of such handovers, in either case taken over a defined recent time period (e.g., the past week or so).

If the processing system finds that such a measure is threshold high (e.g., higher than a predefined threshold, or perhaps higher than a comparable measure of handovers each between the given sector and a neighboring sector having a different reference signal configuration than the given sector), then the processing system could responsively change the given sector's reference signal configuration, to help minimize reference-signal interference.

To change the reference signal configuration of such a sector, the processing system could signal to the eNodeB that provides the sector to cause the eNodeB to make the change, such as to change the PSS (and thus PCI) of the sector so as to change the sector's MOD 3 value and to thereby cause the sector to use a different reference signal configuration. In particular, the processing system could transmit to the eNodeB at issue a control message identifying the sector at issue and specifying the change to be made, and the eNodeB may receive that control message and responsively implement the change.

Further, in another example implementation, the processing system could evaluate a given sector and could determine for each possible reference signal configuration (e.g., one of the three possible reference signal configurations in a current LTE implementation) a respective measure of how many handovers to or from the given sector have each been with a neighboring sector having that reference signal configuration. The processing system could then determine which of the reference signal configurations has a lowest determined measure of how many of the given sector's handovers were each with a neighboring sector having that reference signal configuration. And the processing system could responsively cause the given sector to use that determined reference signal configuration.

Still further, in another example implementation, the processing system could evaluate a given cell site having multiple sectors to determine what permutation of reference signal configurations among the sectors of the cell site would be best. In particular, for each sector of the cell site, the processing system could determine, respectively for each possible reference signal configuration, a measure of how many handovers with the sector have been with a neighboring sector having that reference signal configuration. And based on those determined measures, the processing system could then determine what permutation would help minimize handovers with sectors having the same reference signal configuration.

By way of example, assuming that a cell site has three sectors A, B, and C, and that there are three possible reference signal configurations 0, 1, and 2. For each such sector, the processing system could establish based on the handover data and sector data a measure respectively for each such reference signal configuration of how many of the sector's handovers were with a neighboring sector having that reference signal configuration. Thus, the processing system could establish measures A0, A1, A2, B0, B1, B2, C0, C1, C2, where the letter in each measure indicates the sector of the cell site, and the number in each measure indicates the neighboring sector reference signal configuration.

Given these measures, the processing system could then compute totals of the measures for each possible permutation of the three reference signal configurations among the sectors, namely for {A0, B1, C2}, {A0, B2, C1}, {A1, B0, C2}, {A1, B2, C0}, {A2, B0, C1}, and {A2, B1, C0}. And the processing system could determine which of those computed totals is the lowest and could assign to the sectors of the cell site the associated reference signal configurations. For example, if the processing system determines that the total of measures {A2, B0, C1} is the lowest of the totals, then the processing system could assign reference signal configuration 2 to sector A, reference signal configuration 0 to sector B, and reference signal configuration 1 to sector C. Thus, the processing system could direct the eNodeB of the cell site to implement the determined permutation of reference signal configurations among the sectors of the cell site.

Figure 3:
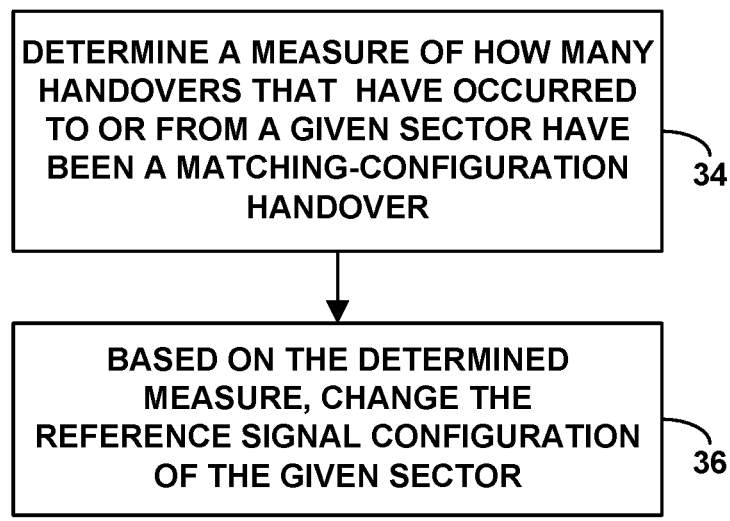
FIG. 3 is a flow chart depicting operations that can be carried out in accordance with the disclosure.

FIG. 3 is a flow chart depicting an example method in line with the discussion above, for configuring reference-signal transmission in a wireless communication system, where the wireless communication system includes a plurality of sectors, each sector having one of a plurality of distinct reference signal configurations, where handovers occur between sectors of the system and wherein each handover is either (i) a matching-configuration handover, in which the reference signal configurations of a source sector and target sector of the handover are the same as each other or (ii) a non-matching-configuration handover, in which the reference signal configurations of the source sector and target sector of the handover are different than each other. This method could be carried out by a processing system as noted above, and/or by one or more other entities, possibly with operations distributed at various base stations or other equipment, and could be carried out for a given sector.

As shown in FIG. 3, at block 34, the method includes determining a measure of how many handovers that have occurred to or from the given sector have been a matching-configuration handover. And at block 36, the method includes, based on the determined measure, changing the reference signal configuration of the given sector.

As discussed above, the measure here could comprise a ratio of (i) a count of matching-configuration handovers to or from the given sector to (ii) a total number of handovers to or from the given sector. Further, the measure could be taken over a defined time window.

In addition, as discussed above, the reference signal configuration of the given sector could occupy a first recurring pattern of time-frequency resources, and the act of changing the reference signal configuration of the given sector could involve changing the reference signal configuration to occupy a second recurring pattern of time-frequency resources, where the first recurring pattern and second recurring pattern are mutually exclusive. And in a specific implementation, the reference signal configuration of the given sector could correspond with a modulo function of a primary synchronization signal of the given sector, and the act of changing the reference signal configuration of the given sector could involve changing the primary synchronization signal of the given sector.

Figure 4:
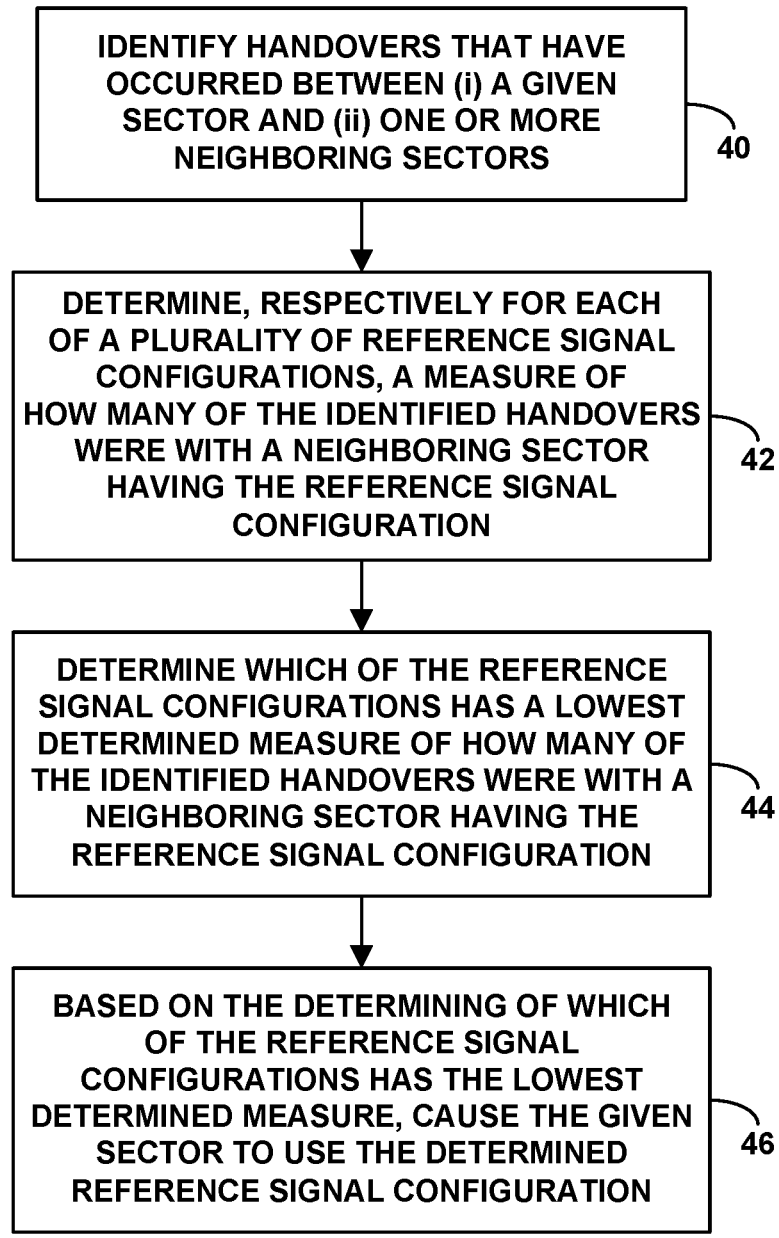
FIG. 4 is another flow chart depicting operations that can be carried out in accordance with the disclosure.

FIG. 4 is next another flow chart depicting an example method in line with the discussion above, also for configuring reference-signal transmission in a wireless communication system, where the wireless communication system includes a plurality of sectors, each sector being configured to use one of a plurality of distinct reference signal configurations. And here again, the method could be implemented by a processing system as discussed above and/or by one or more base stations or other entities, and could be carried out for a given sector.

As shown in FIG. 4, at block 40, the method includes identifying handovers that have occurred between (i) the given sector and (ii) one or more neighboring sectors. Further, at block 42, the method includes determining, respectively for each of the reference signal configurations, a measure of how many of the identified handovers were with a neighboring sector having the reference signal configuration. And at block 44, the method includes determining which of the reference signal configurations has a lowest determined measure of how many of the identified handovers were with a neighboring sector having the reference signal configuration. At block 46, the method then includes, based on the determining of which of the reference signal configurations has the lowest determined measure, causing the given sector to use the determined reference signal configuration.

Here again, the measures could be as discussed above, and the reference signal configurations could be as discussed above. Further, the act of causing the given sector to use the determined reference signal configuration could depend on whether the given sector is already using the determined reference signal configuration. If the given sector is already configured to use the determined reference signal configuration, then causing the given sector to use the determined reference signal configuration could amount to foregoing changing of the given sector's reference signal configuration. Whereas, if the given sector is configured to use a different one of the reference signal configurations, then causing the given sector to use the determined reference signal configuration could involve causing the given sector to transition from using one reference signal configuration to using the determined reference signal configuration. Still further, this could involve causing a change of PSS of the given sector in an implementation as discussed above.

Figure 5:
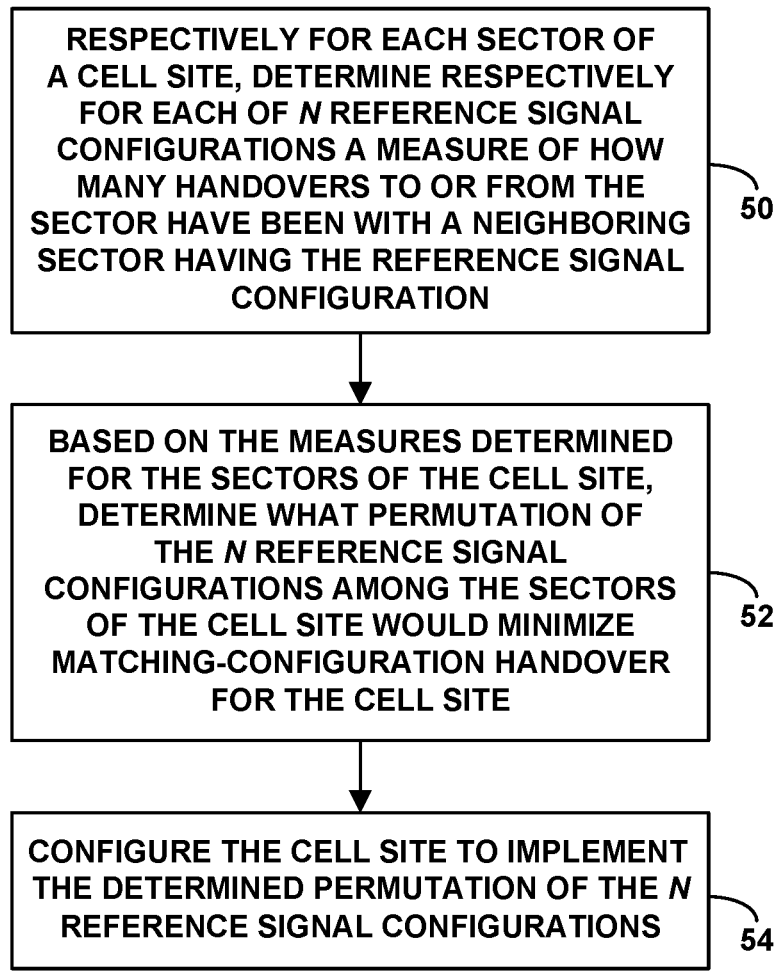
FIG. 5 is yet another flow chart depicting operations that can be carried out in accordance with the disclosure.

FIG. 5 is next a flow chart depicting an example method for configuring reference-signal transmission in a wireless communication system, where the wireless communication system includes a plurality of sectors, each sector being configured to use one of N distinct reference signal configurations, where N is at least 3, where handovers occur between sectors of the system and wherein each handover is either a matching-configuration handover or a non-matching-configuration handover as discussed above, and where the wireless communication system includes a cell site providing N of the sectors. Further, this method could similarly be implemented by a processing system as discussed above and/or by one or more base stations or other entities.

As shown in FIG. 5, at block 50, the method includes, respectively for each sector of the cell site, determining respectively for each of the N reference signal configurations a measure of how many handovers to or from the sector have been with a neighboring sector having the reference signal configuration. At block 52, the method then includes, based on the measures determined for the sectors of the cell site, determining what permutation of the N reference signal configurations among the sectors of the cell site would minimize matching-configuration handover for the cell site. And at block 54, the method includes configuring the cell site to implement the determined permutation of the N reference signal configurations.

In line with the discussion above, if the cell site is configured to implement a first permutation different the determined permutation, the act of configuring the cell site to implement the determined permutation could involve causing the cell site to transition from implementing the first permutation to implementing the determined permutation. Further, the reference signal configures could be structure as described above, with corresponding PSS values, and changes could be made accordingly. Whereas, if the cell site is already configured to implement the determined permutation, the act could involve forgoing changing of the reference signal configurations of the cell site.

Figure 6:
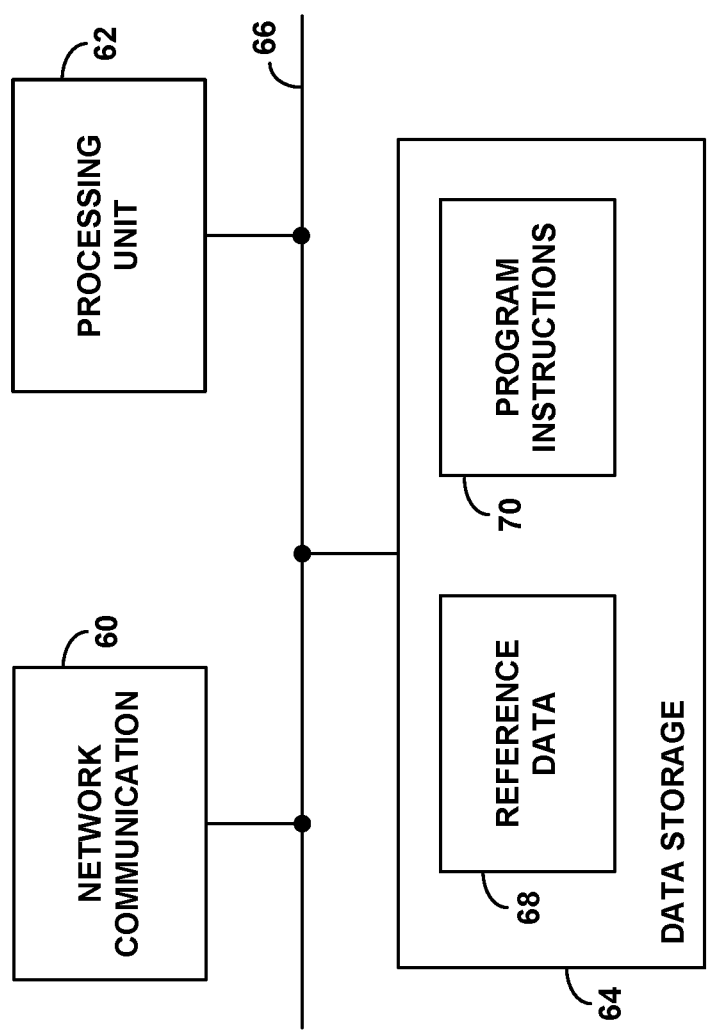
FIG. 6 is a simplified block diagram of a processing system operable in accordance with the disclosure.

Finally, FIG. 6 is a simplified block diagram of an example processing system configured to implement features such as those described above. As shown in FIG. 6, the processing system includes a network communication interface 60, a processing unit 62, and data storage 64, which could be integrated, distributed, or communicatively linked together by a system bus, network, or other mechanism 66.

In the example, the network communication interface 60 may include one or more landline or wireless communication modules to facilitate communication with other entities, such as to send reference signal configuration directives to base stations. The processing unit 62 may then comprise one or more general purpose processors (e.g., microprocessors) and/or one or more special-purpose processors (e.g., application specific integrated circuits). And the data storage 64 may comprise one or more volatile and/or non-volatile storage components (non-transitory) such as magnetic, optical, or flash storage.

As shown, the data storage 64 may then hold reference data 68, which could include the handover data 30 and sector data 32 noted above, and the data storage could further hold program instructions 70, which could be executable by the processing unit 62 to carry out various features as described above.

Exemplary embodiments have been described above. Those skilled in the art will understand, however, that changes and modifications may be made to these embodiments without departing from the true scope and spirit of the invention.

What is claimed is:

1. A method for configuring reference-signal transmission in a wireless communication system, wherein the wireless communication system includes a plurality of sectors, each sector having one of a plurality of distinct reference signal configurations, wherein handovers occur between sectors of the system and wherein each handover is either (i) a matching-configuration handover, in which the reference signal configurations of a source sector and target sector of the handover are the same as each other or (ii) a non-matchingconfiguration handover, in which the reference signal configurations of the source sector and target sector of the handover are different than each other, the method comprising, for a given sector:

determining a measure of how many handovers that have occurred to or from the given sector have been a matching-configuration handover; and based on the determined measure, changing the reference signal configuration of the given sector, wherein the reference signal configuration of the given sector occupies a first recurring pattern of time-frequency resources, and wherein changing the reference signal configuration of the given sector comprises changing the reference signal configuration to occupy a second recurring pattern of time-frequency resources, wherein the first recurring pattern and second recurring pattern are mutually exclusive.

2. The method of claim 1, wherein the measure comprises a ratio of (i) a count of matching-configuration handovers to or from the given sector to (ii) a total number of handovers to or from the given sector.

3. The method of claim 2, wherein the measure is taken over a defined time window.

4. The method of claim 1, wherein the reference signal configuration of the given sector corresponds with a modulo function of a primary synchronization signal of the given sector, and wherein changing the reference signal configuration of the given sector comprises changing the primary synchronization signal of the given sector.

5. The method of claim 1, wherein changing the reference signal configuration of the sector comprises transmitting to a base station of the given sector a directive to which the base station responds by changing the reference signal configuration of the given sector.

6. The method of claim 1, carried out at a base station of the given sector.

7. A method for configuring reference-signal transmission in a wireless communication system, wherein the wireless communication system includes a plurality of sectors, each sector being configured to use one of a plurality of distinct reference signal configurations, wherein each reference signal configuration occupies a recurring pattern of time-frequency resources, and wherein the recurring pattern of time-frequency resources occupied by each reference signal configuration of the plurality of reference signal configurations is mutually exclusive of the recurring pattern of time-frequency resources occupied by each other reference signal configuration of the plurality of reference signal configurations, the method comprising, for a given sector:

identifying handovers that have occurred between (i) the given sector and (ii) one or more neighboring sectors;

determining, respectively for each of the reference signal configurations, a measure of how many of the identified handovers were with a neighboring sector having the reference signal configuration;

determining which of the reference signal configurations has a lowest determined measure of how many of the identified handovers were with a neighboring sector having the reference signal configuration; and based on the determining of which of the reference signal configurations has the lowest determined measure, causing the given sector to use the determined reference signal configuration.

8. The method of claim 7, wherein the measure determined for each reference signal configuration comprises a ratio of (i) a count of the identified handovers that were with a neighboring sector having the reference signal configuration to (ii) a total number of the identified handovers.

9. The method of claim 8, wherein the measure is taken over a defined time window.

10. The method of claim 7, wherein the given sector is already configured to use the determined reference signal configuration, and wherein causing the given sector to use the determined reference signal configuration comprises foregoing changing of the given sector's reference signal configuration.

11. The method of claim 7, wherein the given sector is configured to use a first one of the reference signal configurations, wherein the determined reference signal configuration is a second one of the reference signal configurations, and wherein causing the given sector to use the determined reference signal configuration comprises causing the given sector to transition from using the first reference signal configuration to using the second reference signal configuration.

12. The method of claim 11, wherein the reference signal configuration of the given sector corresponds with a modulo function of a primary synchronization signal of the given sector, and wherein causing the given sector to transition from using the first reference signal configuration to using the second reference signal configuration comprises causing a change to the primary synchronization signal of the given sector.

13. The method of claim 11, wherein causing the given sector to transition from using the first reference signal configuration to using the second reference signal configuration comprises transmitting to a base station of the given sector a directive to which the base station is configured to respond by changing the reference signal configuration of the given sector.

14. The method of claim 7, carried out at a base station of the given sector.

15. The method of claim 7, wherein each of the reference signal configurations defines a respective recurring pattern of time-frequency resources, wherein the respective recurring patterns of time-frequency resources of the reference signal configurations are mutually exclusive.

16. A method for configuring reference-signal transmission in a wireless communication system, wherein the wireless communication system includes a plurality of sectors, each sector being configured to use one of N distinct reference signal configurations, wherein N is at least 3, wherein each reference signal configuration defines a recurring pattern of frequency-time resource elements in which to broadcast a reference signal, and wherein the recurring pattern of frequency-time resources defined by each reference signal configuration of the N reference signal configurations is mutually exclusive of the recurring pattern of frequency-time resources defined by each other reference signal configuration of the N reference signal configurations, wherein handovers occur between sectors of the system and wherein each handover is either (i) a matching-configuration handover, in which the reference signal configurations of a source sector and target sector of the handover are the same as each other or (ii) a non-matching-configuration handover, in which the reference signal configurations of the source sector and target sector of the handover are different than each other, and wherein the wireless communication system includes a cell site providing N of the sectors, the method comprising:

respectively for each sector of the cell site, determining respectively for each of the N reference signal configurations a measure of how many handovers to or from the sector have been with a neighboring sector having the reference signal configuration;

based on the measures determined for the sectors of the cell site, determining what permutation of the N reference signal configurations among the sectors of the cell site would minimize matching-configuration handover for the cell site; and configuring the cell site to implement the determined permutation of the N reference signal configurations, wherein the cell site is configured to implement a first permutation different than the determined permutation, and wherein configuring the cell site to implement the determined permutation comprises causing the cell site to transition from implementing the first permutation to implementing the determined permutation.

17. The method of claim 16, wherein each sector's reference signal configuration corresponds with a modulo N function of a primary synchronization signal value of the sector, and wherein configuring the cell site to implement the determined permutation of the N reference signal configurations comprises configuring the primary synchronization signal values of the sectors of the cell site to implement the determined permutation of the N reference signal configurations.

* * * * *